US008387396B2

(12) United States Patent
Chen et al.

(10) Patent No.: US 8,387,396 B2
(45) Date of Patent: Mar. 5, 2013

(54) AIRFOIL, SLEEVE, AND METHOD FOR ASSEMBLING A COMBUSTOR ASSEMBLY

(75) Inventors: Wei Chen, Greer, SC (US); Stephen Robert Thomas, Simpsonville, SC (US); Geoffrey David Myers, Simpsonville, SC (US); Vijay Kumar Turaga, Hyderabad (IN)

(73) Assignee: General Electric Company, Schenectady, NY (US)

( * ) Notice: Subject to any disclaimer, the term of this patent is extended or adjusted under 35 U.S.C. 154(b) by 1135 days.

(21) Appl. No.: 11/621,168

(22) Filed: Jan. 9, 2007

(65) Prior Publication Data

US 2008/0166220 A1 Jul. 10, 2008

(51) Int. Cl.
*F02C 1/00* (2006.01)

(52) U.S. Cl. .......................................... 60/755; 60/752

(58) Field of Classification Search .................... 60/752, 60/755, 756, 757, 758, 759, 760
See application file for complete search history.

(56) References Cited

U.S. PATENT DOCUMENTS

| | | | | |
|---|---|---|---|---|
| 5,737,915 | A | 4/1998 | Lin et al. | |
| 6,000,908 | A * | 12/1999 | Bunker | 416/95 |
| 6,122,917 | A * | 9/2000 | Senior | 60/752 |
| 6,484,505 | B1 | 11/2002 | Brown et al. | |
| 6,494,044 | B1 | 12/2002 | Bland | |
| 6,532,744 | B1 | 3/2003 | Reiter et al. | |
| 6,890,148 | B2 | 5/2005 | Nordlund | |
| 7,010,921 | B2 | 3/2006 | Intile et al. | |
| 7,047,723 | B2 | 5/2006 | Martling et al. | |
| 2002/0189260 | A1* | 12/2002 | David et al. | 60/746 |
| 2003/0000219 | A1* | 1/2003 | Tiemann | 60/772 |
| 2005/0268613 | A1 | 12/2005 | Intile et al. | |
| 2005/0268615 | A1 | 12/2005 | Bunker et al. | |
| 2006/0101801 | A1 | 5/2006 | Bland | |
| 2006/0260320 | A1* | 11/2006 | Bertolotti et al. | 60/772 |
| 2007/0151251 | A1* | 7/2007 | Haynes | 60/772 |

FOREIGN PATENT DOCUMENTS

| | | | |
|---|---|---|---|
| JP | 57061974 | B | 12/1982 |
| JP | 61192166 | U1 | 11/1986 |
| JP | 09041991 | A | 2/1997 |
| JP | 2001289442 | A | 10/2001 |
| JP | 2000146186 | A | 5/2005 |

OTHER PUBLICATIONS

JP Office Action dated Feb. 28, 2012 from corresponding Application No. 2008-000234 along with unofficial English translation.

* cited by examiner

*Primary Examiner* — Gerald Sung
(74) *Attorney, Agent, or Firm* — Armstrong Teasdale LLP

(57) ABSTRACT

A method for assembling a combustor assembly is provided. The method includes providing at least one sleeve having a plurality of inlets, and coupling at least one airfoil to at least one of the plurality of inlets defined in the at least one sleeve. The airfoil includes a pair of opposing sidewalls coupled together at a leading edge and at a trailing edge and at least one channel is formed between the airfoil sidewalls for channeling cooling air. The cooling air is directed to flow substantially perpendicularly to a direction of air flowing around the airfoil in a portion of the combustor assembly that is to be cooled. The method also includes coupling the at least one sleeve around the portion of the combustor assembly to be cooled. Also provided are a sleeve and an airfoil for use in a combustor assembly.

10 Claims, 8 Drawing Sheets

AIRFOIL, SLEEVE, AND METHOD FOR ASSEMBLING A COMBUSTOR ASSEMBLY

BACKGROUND OF THE INVENTION

This invention relates generally to gas turbine engines and more particularly, to cooling combustor assemblies for use with gas turbine engines.

At least some known gas turbine engines use cooling air to cool a combustion assembly within the engine. Often the cooling air is supplied from a compressor coupled in flow communication with the combustion assembly. In at least some known gas turbine engines, the cooling air is discharged from the compressor into a plenum extending at least partially around an impingement sleeve and a flow sleeve which extends over a transition piece and combustor liner, respectively. Cooling air from the plenum flows through inlets of these sleeves and enters into cooling passages that are defined between the impingement sleeve and the transition piece (the transition passage) and between the combustor liner and flow sleeve (the liner passage). Cooling air flowing through the transition passage is discharged into the liner passage. The cooling air is heated by the metal surface of the transition piece and/or the combustor liner and is then mixed with fuel for use by the combustor.

It is desirable that the combustion liner and transition piece be evenly cooled in order to protect the mechanical properties and prolong the operative life of the combustion liner and transition piece. At least some known flow sleeves and impingement sleeves include inlets that are shaped or configured to facilitate the flow of cooling air through them. Other inlets are filled with open-ended thimbles that are configured to direct the cooling air into the cooling passages at an angle that is substantially perpendicular to the flow of the cooling air already in the channels. For both of these options, the air flowing through the passages may lose axial momentum, due to the opposing flow orientations, and may also create a barrier to the momentum of the cooling air entering from the plenum.

BRIEF DESCRIPTION OF THE INVENTION

In one aspect, a method for assembling a combustor assembly is provided. The method includes providing at least one sleeve having a plurality of inlets, and coupling at least one airfoil to at least one of the plurality of inlets defined in the at least one sleeve. The airfoil includes a pair of opposing sidewalls coupled together at a leading edge and at a trailing edge and at least one channel is formed between the airfoil sidewalls for channeling cooling air. The cooling air is directed to flow substantially perpendicularly to a direction of air flowing around the airfoil in a portion of the combustor assembly that is to be cooled. The method also includes coupling the at least one sleeve around the portion of the combustor assembly to be cooled.

In another aspect, a sleeve for use in a combustor assembly is provided. The sleeve includes a plurality of airfoil projections defined in the sleeve, wherein each airfoil projection is configured to channel cooling air into a cooling passage of the combustor assembly. Each airfoil projection includes a pair of opposing sidewalls coupled together at a leading edge and at a trailing edge, and at least one channel defined between the sidewalls for channeling cooling air therethrough. The at least one channel is configured to channel the air in a direction that is substantially perpendicular to a direction of air flowing around the airfoil in the cooling passage.

In a further aspect, an airfoil for channeling cooling air into a cooling passage of a combustor assembly is provided. The airfoil includes a pair of opposing sidewalls that are coupled together at a leading edge and at a trailing edge such that the airfoil is substantially symmetrical about a center plane extending between the opposing sidewalls. The airfoil also includes a first end portion and a second end portion, wherein each end portion is substantially perpendicular to and extends between the opposing sidewalls. The airfoil also includes at least one channel for channeling cooling air therethrough. The at least one channel is defined between the sidewalls and extends from the first end portion to the second end portion.

DETAILED DESCRIPTION OF THE INVENTION

Figure 1:
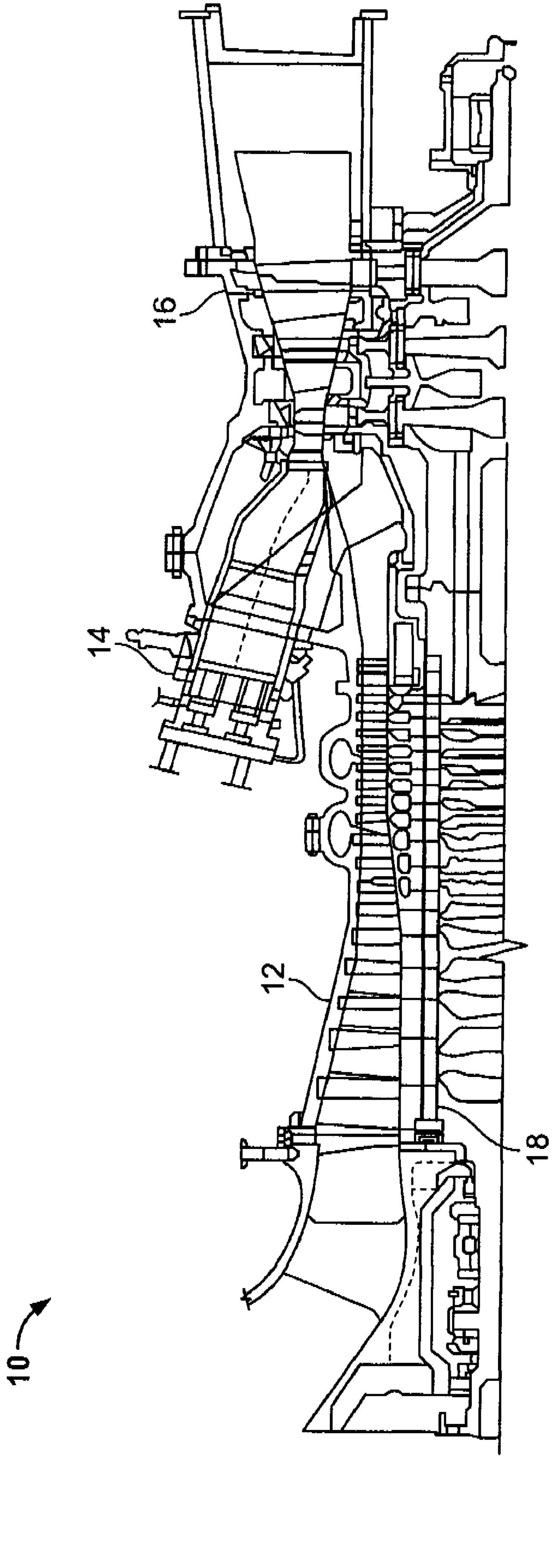
FIG. 1 is a schematic cross-sectional illustration of an exemplary gas turbine engine.

FIG. 1 is a schematic cross-sectional illustration of an exemplary gas turbine engine 10. Engine 10 includes a compressor assembly 12, a combustor assembly 14, a turbine assembly 16 and a common compressor/turbine rotor shaft 18. It should be noted that engine 10 is exemplary only, and that embodiments of the present invention are not limited to engine 10 and may instead be implemented within any gas turbine engine or heated system that requires cooling in a similar manner described herein.

In operation, air flows through compressor assembly 12 and compressed air is discharged to combustor assembly 14 for mixing with fuel and cooling parts of combustor assembly 14. Combustor assembly 14 injects fuel, for example, natural gas and/or fuel oil, into the air flow, ignites the fuel-air mixture to expand the fuel-air mixture through combustion and generates a high temperature combustion gas stream. Combustor assembly 14 is in flow communication with turbine assembly 16, and discharges the high temperature expanded gas stream into turbine assembly 16. The high temperature expanded gas stream imparts rotational energy to turbine assembly 16 and because turbine assembly 16 is rotatably coupled to rotor 18, rotor 18 subsequently provides rotational power to compressor assembly 12.

Figure 2:
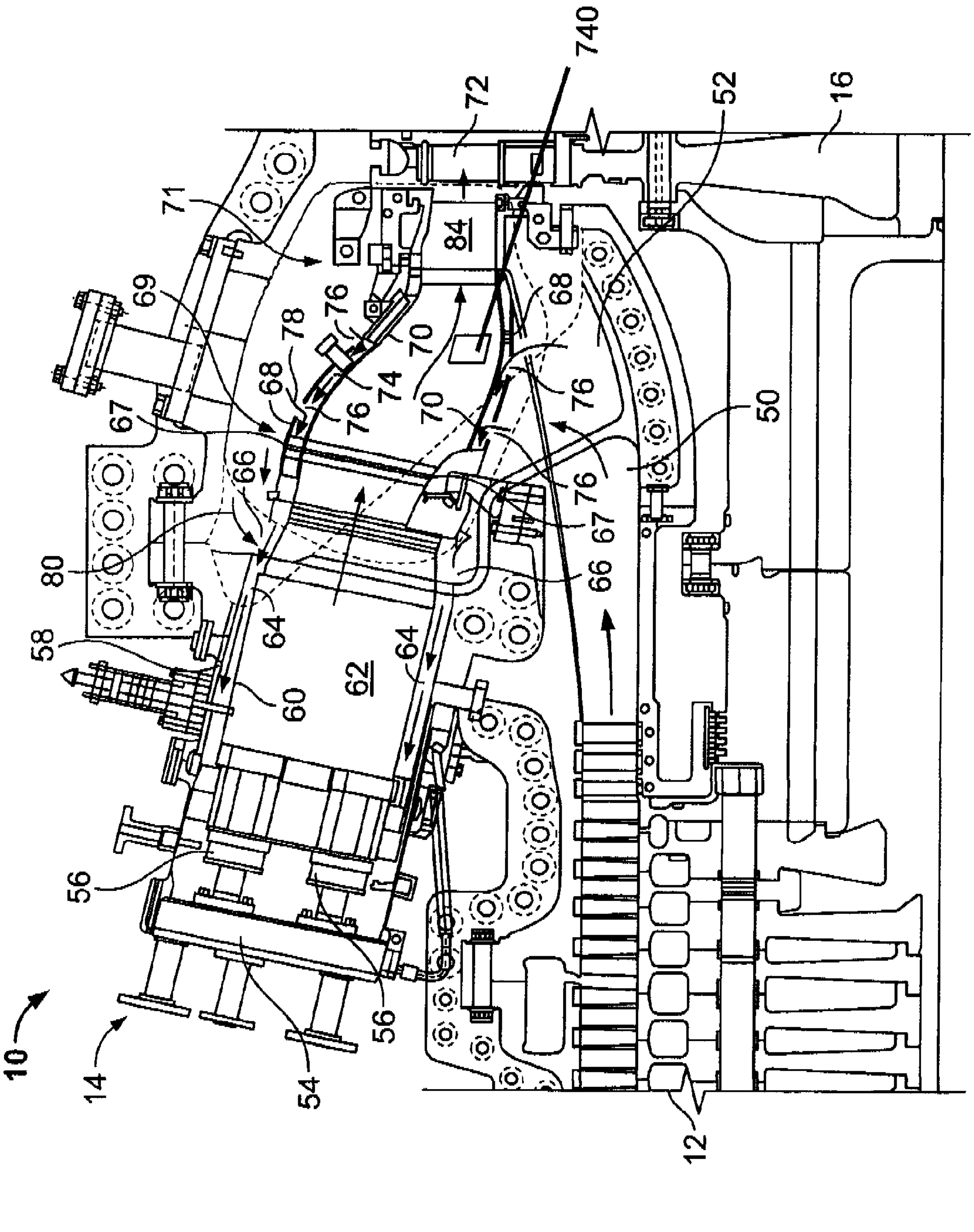
FIG. 2 is an enlarged cross-sectional illustration of a portion of an exemplary combustor assembly that may be used with the gas turbine engine shown in FIG. 1.

FIG. 2 is an enlarged cross-sectional illustration of a portion of combustor assembly 14. Combustor assembly 14 is coupled in flow communication with turbine assembly 16 and with compressor assembly 12. Compressor assembly 12 includes a diffuser 50 and a discharge plenum 52 that are coupled to each other in flow communication to channel air through combustor assembly 14 as discussed further below.

Combustor assembly 14 includes a substantially circular dome plate 54 that at least partially supports a plurality of fuel nozzles 56. Dome plate 54 is coupled to a substantially cylindrical combustor flow sleeve 58 with retention hardware (not shown in FIG. 2). A substantially cylindrical combustor liner 60 is positioned within flow sleeve 58 and is supported via flow sleeve 58. Liner 60 defines a substantially cylindrical combustor chamber 62. More specifically, liner 60 is spaced radially inward from flow sleeve 58 such that an annular combustion liner cooling passage 64 is defined between flow sleeve 58 and combustor liner 60. Flow sleeve 58 defines a plurality of inlets 66 that enable a portion of airflow from compressor discharge plenum 52 to flow into liner cooling passage 64.

An impingement sleeve 68 is coupled to and substantially concentric with combustor flow sleeve 58 at an upstream end 69 of impingement sleeve 68. A transition piece 70 is coupled to a downstream end 67 of impingement sleeve 68. Transition piece 70, along with liner 60, facilitates channeling combustion gases generated in chamber 62 downstream to a turbine nozzle 84. A transition piece cooling passage 74 is defined between impingement sleeve 68 and transition piece 70. A plurality of openings 76 defined within impingement sleeve 68 enable a portion of air flow from compressor discharge plenum 52 to be channeled into transition piece cooling passage 74.

In operation, compressor assembly 12 is driven by turbine assembly 16 via shaft 18 (shown in FIG. 1). As compressor assembly 12 rotates, it compresses air and discharges compressed air into diffuser 50 as shown in FIG. 2 (airflow is indicated by the arrows). In the exemplary embodiment, a portion of air discharged from compressor assembly 12 is channeled through compressor discharge plenum 52 towards combustor chamber 62, and another portion of air discharged from compressor assembly 12 is channeled downstream for use in cooling engine 10 components. More specifically, a first flow leg 78 of the pressurized compressed air within plenum 52 is channeled into transition piece cooling passage 74 via impingement sleeve openings 76. The air is then channeled upstream within transition piece cooling passage 74 and discharged into combustion liner cooling passage 64. In addition, a second flow leg 80 of the pressurized compressed air within plenum 52 is channeled around impingement sleeve 68 and injected into combustion liner cooling passage 64 via inlets 66. Air entering inlets 66 and air from transition piece cooling passage 74 is then mixed within liner cooling passage 64 and is then discharged from liner cooling passage 64 into fuel nozzles 56 wherein it is mixed with fuel and ignited within combustion chamber 62.

Flow sleeve 58 substantially isolates combustion chamber 62 and its associated combustion processes from the outside environment, for example, surrounding turbine components. The resultant combustion gases are channeled from chamber 62 towards and through a cavity of transition piece 70 that channels the combustion gas stream towards turbine nozzle 84.

Figure 3:
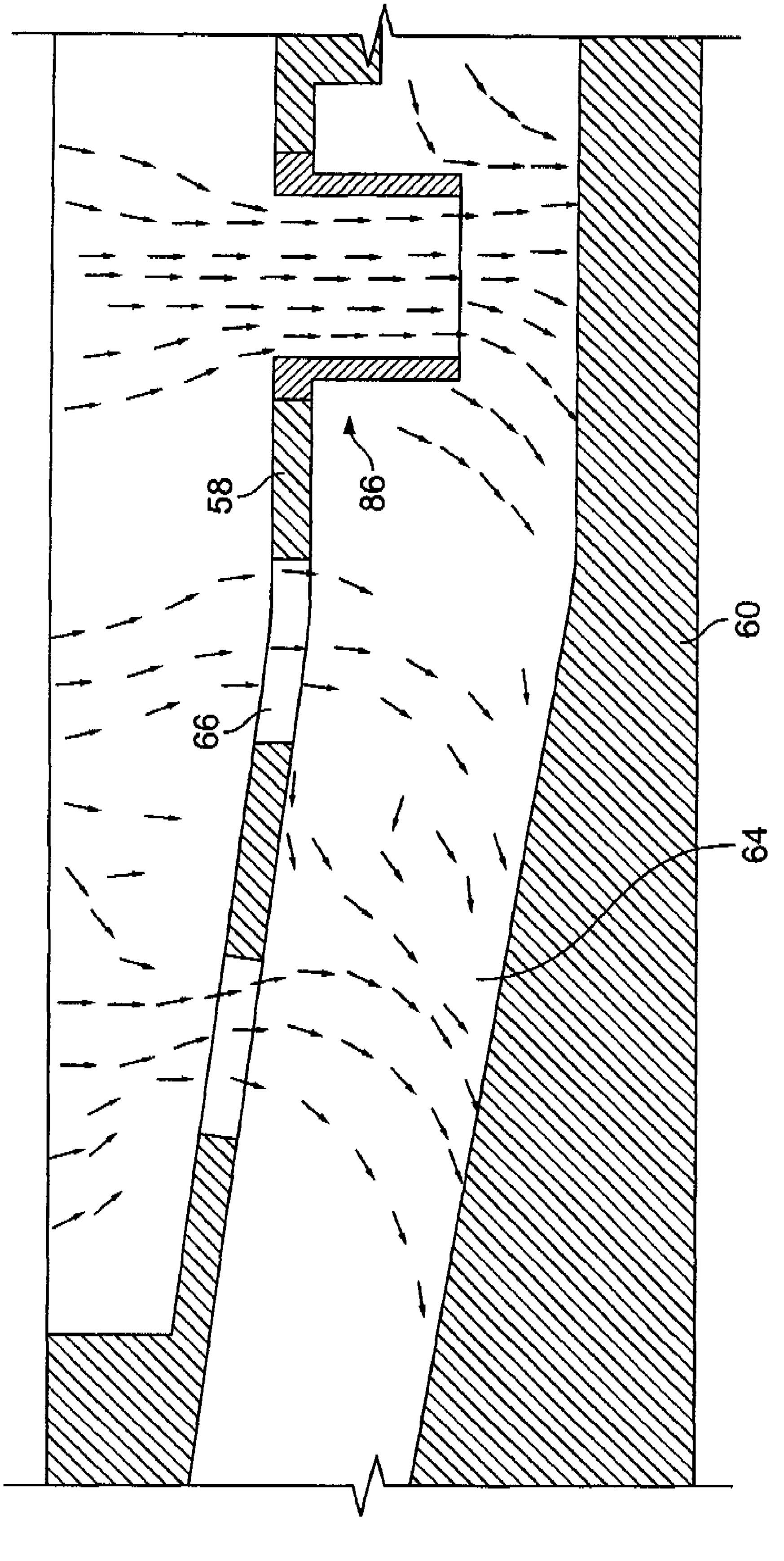
FIG. 3 is a cross-sectional view of a liner passage as compressed cooling air enters the passage.

FIG. 3 is a cross-sectional view of liner cooling passage 64 as the compressed air enters liner cooling passage 64 through flow sleeve 58 via inlets 66. At least some known systems utilize a straight thimble 86 or thimbles 86 positioned within and covering inlet 66 for directing compressed air into liner cooling passage 64. Thimbles 86 facilitate heat transfer by directing the compressed air further into liner cooling passage 64 and creating a greater likelihood that the cool compressed air will reach liner 60 (also referred to as impinging liner 60). Although FIG. 3 illustrates compressed air entering liner cooling passage 64 through inlets 66 with and without thimbles 86, a similar configuration can be used in directing compressed air into transition piece cooling passage 74.

When compressed air enters either transition piece cooling passage 74 or liner cooling passage 64, pressure loss may occur. Some of this pressure loss is useful because it maximizes heat transfer, such as the loss that occurs when the airflow mixes with the passage airflow and/or impinges upon the liner 60 or transition piece 70. However, other pressure loss is wasted due to dump losses or turning losses.

Figure 4:
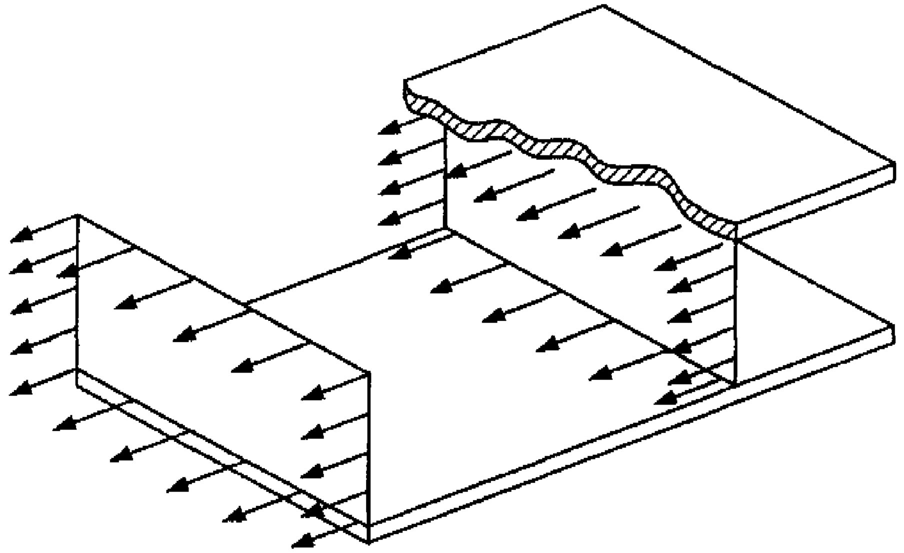
FIG. 4 illustrates a parallel flow of air that may be formed in the liner passage shown in FIG. 3.
Figure 5:
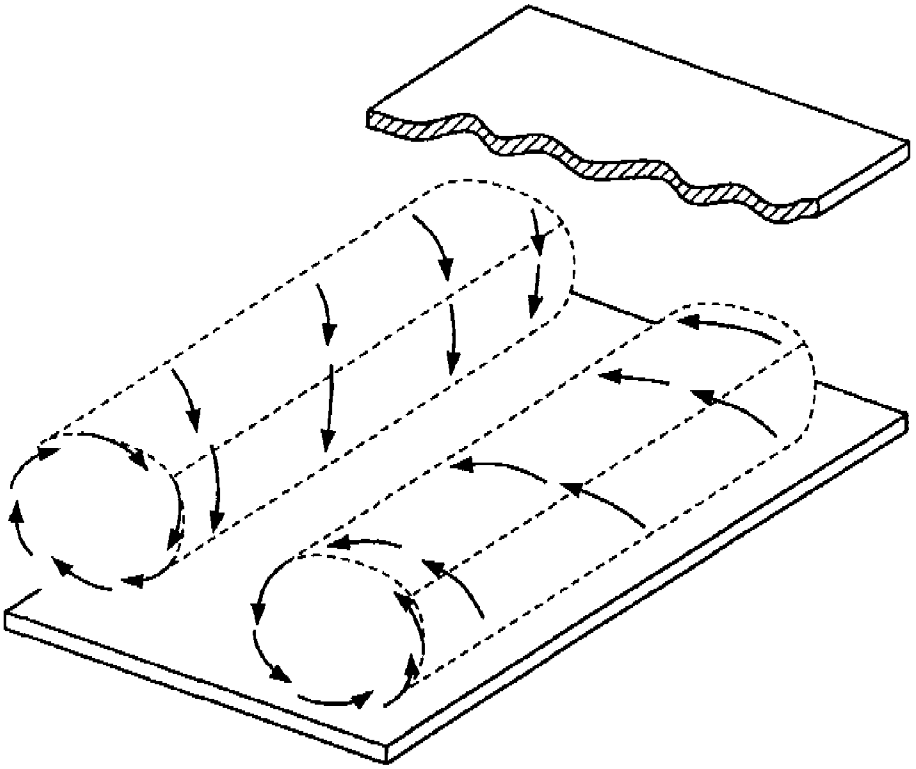
FIG. 5 illustrates a turbulent airflow that may be formed in the liner passage shown in FIG. 3.

In order to facilitate maximizing useful pressure loss and minimizing wasted pressure loss, thimbles 86, liner cooling passage 64, and transition piece cooling passage 74 can be configured to maintain a Taylor-Gortler type of flow (also referred to as a turbulent airflow). FIGS. 4 and 5 illustrate a parallel flow and a turbulent flow of air, respectively, with the arrows indicating the direction of airflow. A parallel airflow may lead to less mixing with the passage airflow and less impinging with liner 60 or transition piece 70 than a turbulent airflow.

Embodiments of the present invention can also be used to facilitate cooling a combustor assembly by enhancing the heat transfer and can be used to facilitate reducing the amount of pressure loss.

Figure 6:
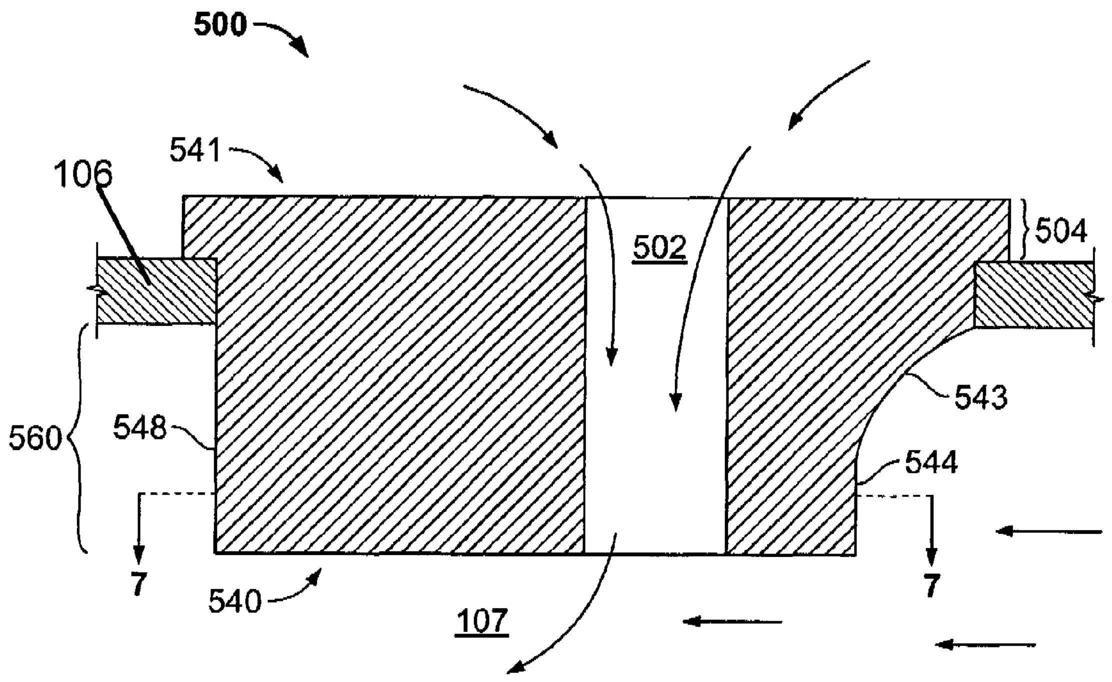
FIG. 6 is a cross-sectional view of an exemplary embodiment of an airfoil used with the liner passage shown in FIG. 3.

FIGS. 6-9 illustrate airfoils that may be used with a sleeve 106, such as flow sleeve 58 or impingement sleeve 68. Airfoils can be used, for example, when the ratio of cross flow (i.e., passage flow) momentum to channel flow momentum is very high, and can also be used when it is desired to reduce the pressure loss due to wake formation. FIG. 6 illustrates a cross-sectional view of an exemplary embodiment of an airfoil 500. Airfoil 500 defines a channel 502 that is configured to allow cooling air to pass therebetween. Although channel 502 is a substantially circular passageway, channel 502 can have any shape or configuration that allows air to pass through.

Furthermore, airfoil 500 includes a flange portion 504 that engages sleeve 106 when airfoil 500 is placed in sleeve 106. Flange portion extends from opposing sidewalls 550 and 552 and has an outer width. A passage portion 560 is defined by an outer surface of each opposing sidewall 550 and 552 and has an outer width. Passage portion 560 is coupled to and downstream from flange portion 504 (with respect to channel 502). The outer width of flange portion 504 is greater than the outer width of passage portion 560, such that flange portion 504 could not be forced through sleeve 106.

Figure 7:
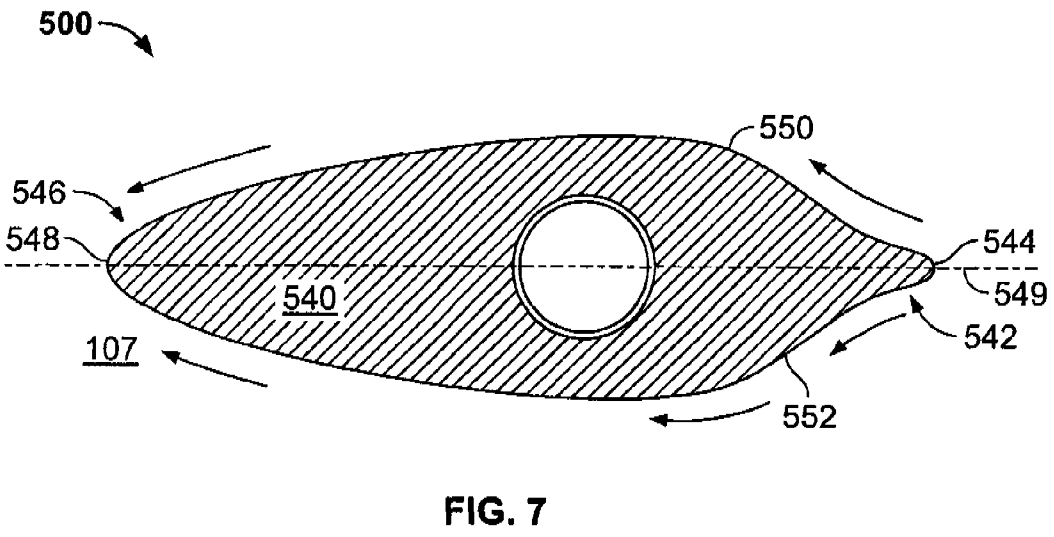
FIG. 7 illustrates a perspective view of the airfoil shown in FIG. 6.

FIG. 7 illustrates a bottom perspective of airfoil 500. Airfoil 500 has a substantially aerodynamic shape including first sidewall 550 and second sidewall 552, which define a leading edge 542 and a trailing edge 546. Leading edge 542 diverts airflow of passage 107. In some embodiments, as shown in FIG. 6, leading edge 542 includes a fin portion 543 that is configured to direct the passage airflow downward further into passage 107 toward the liner or transition piece. In some embodiments, leading edge 542 includes a cusp 544 (shown in FIGS. 6 and 7) to facilitate further reducing wake formation. In other embodiments, leading edge 542 is substantially triangular.

Also shown in FIG. 7, a center plane indicated by line 549 extends between sidewalls 550 and 552 such that airfoil 500 is symmetrical with reference to the center plane. Also shown in FIGS. 6 and 7, airfoil 500 includes a first end portion 541 and a second end portion 540 where each end portion 540 and

541 is substantially perpendicular to and extends between opposing sidewalls 550 and 552. In some embodiments, end portions 540 and 541 are substantially flat. In other embodiments, at least some of end portions 540 and 541 are aerodynamically configured.

Trailing edge 546 of airfoil 500 is also configured to reduce wake formation. Trailing edge 546 is defined as the portion of airfoil 500 where sidewalls 550 and 552 begin to narrow as the sidewalls extend downstream. Trailing edge 546 is longer than leading edge 542. In one embodiment, sidewalls 550 and 552 taper to an endpoint 548.

Figure 8:
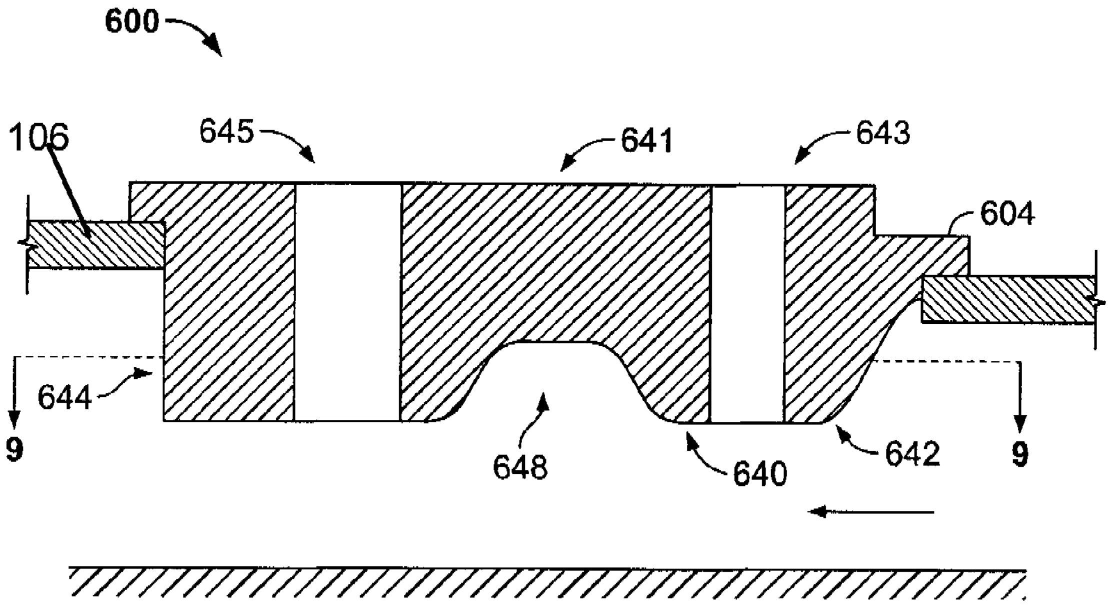
FIG. 8 is a cross-sectional view of a further embodiment of a multi-channel airfoil used with the liner passage shown in FIG. 3.
Figure 9:
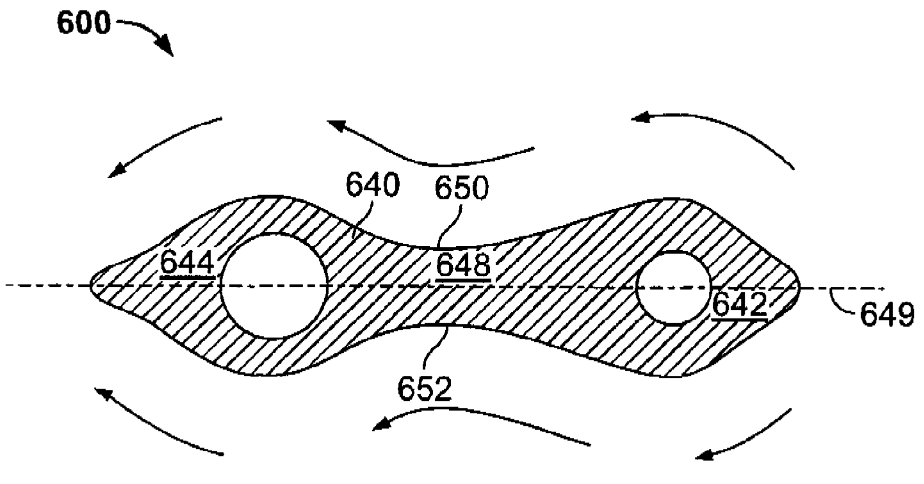
FIG. 9 illustrates a perspective view of the multi-channel airfoil shown in FIG. 8.

FIGS. 8 and 9 illustrate an airfoil 600 having multiple channels. Airfoil 600 is configured similarly to airfoil 500 discussed above. Airfoil 600 includes a flange portion 604 that engages sleeve 106 when airfoil 600 is placed in between an opening of sleeve 106. Airfoil 600 has a substantially aerodynamic shape including a first sidewall 650 and a second sidewall 652, which define a leading edge 642, a trailing edge 644, a first channel 643, and a second channel 645. Leading edge 642 is coupled to or positioned near first channel 643, and trailing edge 644 is coupled to or positioned near second channel 645. Leading edge 642 and trailing edge 644 can be configured similarly to leading edge 542 and trailing edge 546 (discussed above). Moreover, although channels 643 and 645 in FIG. 9 are aligned with respect to each other and the direction of passage airflow, embodiments of the present invention may also include channels that are not inline with each other and the direction of passage airflow.

In addition, in some embodiments, airfoil 600 includes a recessed section 648 joining two channels. Although FIGS. 8 and 9 illustrate recessed section 648 joining first channel 643 and second channel 645, embodiments of the present invention can also include three or more channels, optionally having additional recessed sections 648 joining the channels. In one embodiment, at least a portion of recessed section 648 extends a depth into the cooling passage that is shallower than the depths of first channel 643 and second channel 645, or the furthest depth of leading edge 642 or trailing edge 644. Furthermore, in some embodiments, opposing sidewalls 650 and 652 of recessed section 648 meet together in a triangular or cusp-like shape for at least a portion of recessed section 648. This portion points downstream (with respect to channel airflow) in the direction of the liner or transition piece.

As shown in FIG. 9, a center plane indicated by line 649 extends between sidewalls 650 and 652 such that airfoil 600 is symmetrical with reference to the center plane. Also shown in FIGS. 8 and 9, airfoil 600 includes a first end portion 641 and a second end portion 640 where each end portion 640 and 641 is substantially perpendicular to and extends between opposing sidewalls 650 and 652. In some embodiments, end portions 640 and 641 are substantially flat. In other embodiments, at least some of end portions 640 and 641 are aerodynamically configured.

Because airfoils can have long lengths, curves in sleeve 106 may require leveling adjustments in the airfoil. As illustrated in FIG. 8, flange portion 604 may include multiple levels in order to accommodate for the design of sleeve 106. Although FIG. 8 illustrates multiple levels for airfoil 600, multiple levels may be used for airfoil 500 as well. These levels can have varying thicknesses. In an alternative embodiment, flange portion 604 (or 504) gently slopes until it is flush or even with sleeve 106. In other embodiments, airfoils 600 and 500 are manufactured having equal curvature as sleeve 106, thus reducing or eliminating the need for leveling adjustments.

Although airfoils 500 and 600 appear separate or removable from sleeve 106, embodiments of the present invention also include airfoils that are integrated into sleeve 106 (i.e., coupled or secured to sleeve 106) and sleeves 106 that are manufactured to define or form airfoil projections that are similar in shape to the airfoils described herein. Airfoils 500 and 600, sleeves 106, or templates 740 (discussed below) can be manufactured from any suitable material that can withstand the heat, pressure, and vibrations of the combustor assembly, including the material used to manufacture the flow sleeve or impingement sleeve.

Figure 10:
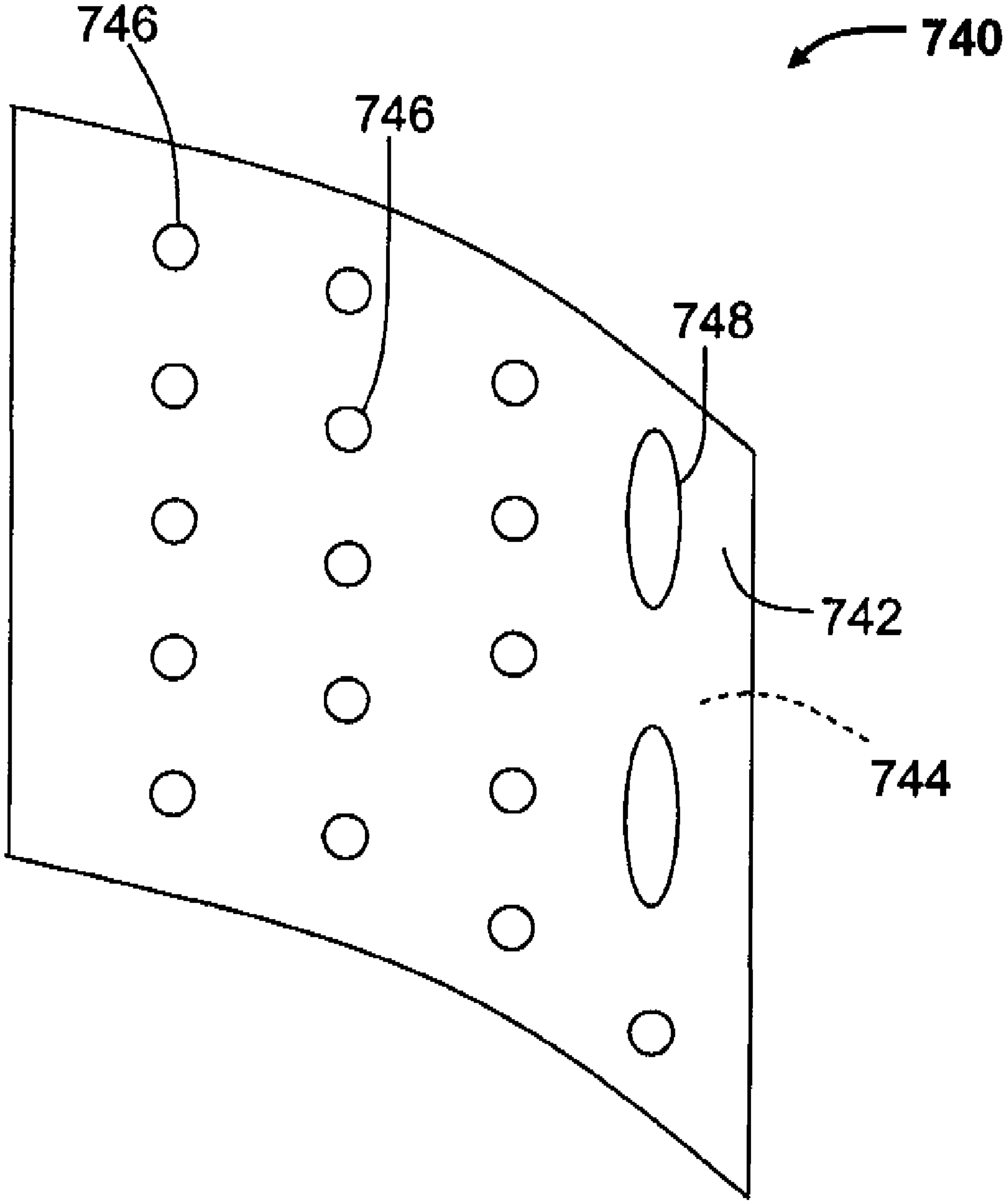
FIG. 10 is a perspective view of an exemplary embodiment of a template.
Figure 11:
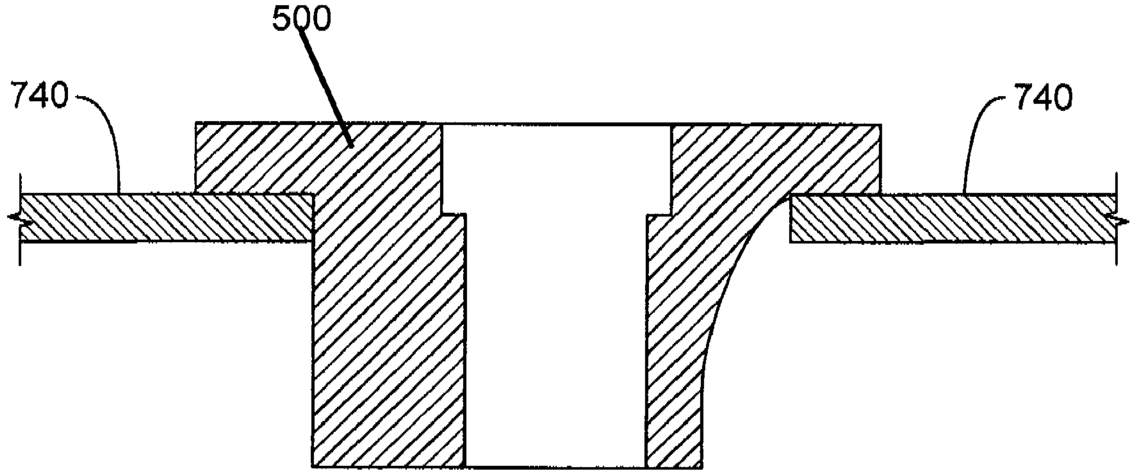
FIG. 11 is a cross-sectional view of the template shown in FIG. 10.

Embodiments of the present invention also include a template 740 that can be inserted or coupled to portions of sleeve 106, such as flow sleeve 58 and impingement sleeve 68. FIG. 10 is a perspective view of template 740, and FIG. 11 is a cross-sectional view of template 740. Template 740 is configured to facilitate channeling cooling air into transition piece cooling passage 74 of combustor assembly 14. Template 740 includes an outer surface 742, an inner surface 744, and a plurality of openings 746 extending between outer surface 742 and inner surface 744. Outer surface 742 is shaped and designed to substantially match a contour of a portion of flow sleeve 58 or impingement sleeve 68.

Template 740 may be placed at any location, however, template 740 is particularly useful where heat transfer is uncertain, the pressure field is varied substantially, or where pressure oscillations are expected. For example, FIG. 1 illustrates template 740 positioned near the downstream end of impingement sleeve 68. Template 740 enables an operator of combustor assembly 14 to optimize one of heat transfer, pressure loss reduction, or reduction of combustion dynamics for a portion of sleeve 106.

Template 740 may be securely coupled or removably coupled to sleeve for directing the cooling air through openings. Openings 746 can be sized to fit a thimble, such as thimble 86, or can be sized to fit an airfoil, such as airfoils 500 and 600 (as shown in FIG. 11). The airfoil or contoured thimble can be fitted into templates 740 in order to satisfy requirements for heat transfer, combustion dynamics, or pressure drop.

Template 740 enables an operator to reconfigure the cooling of combustor assembly 14 when operating conditions of combustor assembly 14 are changed. For example, in addition to being coupled to thimbles 86 or airfoils 500 and 600, openings 746 may be covered or closed during testing or operation of combustor assembly. Furthermore, openings 746 may be arranged in a grid pattern, such as in two rows, and arranged to facilitate one of cooling combustor assembly 14, reducing pressure loss, and abating combustion dynamics.

The present invention also provides a sleeve for use in a combustor assembly. The sleeve includes a plurality of airfoil projections defined in the sleeve, wherein each airfoil projection is configured to channel cooling air into a cooling passage of the combustor assembly. Each airfoil projection includes a pair of opposing sidewalls coupled together at a leading edge and at a trailing edge, and at least one channel defined between the sidewalls for directing cooling air therethrough. The at least one channel is configured to lead the air in a direction that is substantially perpendicular to a direction of air flowing around the airfoil in the cooling passage.

The present invention also provides a method for assembling a combustor assembly. The method includes providing at least one sleeve having a plurality of inlets, and coupling at least one airfoil to at least one of the plurality of inlets defined in the at least one sleeve. The airfoil includes a pair of opposing sidewalls coupled together at a leading edge and at a trailing edge and at least one channel is formed between the airfoil sidewalls for channeling cooling air. The cooling air is directed to flow substantially perpendicularly to a direction of air flowing around the airfoil in a portion of the combustor assembly that is to be cooled. The method also includes coupling the at least one sleeve around the portion of the combustor assembly to be cooled.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Described herein are embodiments for airfoils, sleeves, and templates, which allow the cooling of transition piece 70 and combustor liner 60 to be optimized such that there is a reduced temperature gradient. Likewise, embodiments of the present invention facilitate reducing pressure losses. Furthermore, because some of the thimbles, airfoils, and templates described herein are removable, the arrangements can be altered if any changes are made to the combustion process (e.g., changes to loading schedule, firing temperature, fuel, etc.).

Although the apparatus and methods described herein are described in the context of a combustor assembly for a gas turbine engine, it is understood that the apparatus and methods are not limited to combustor assemblies or gas turbine engines. Likewise, the components illustrated are not limited to the specific embodiments described herein, but rather, components of the airfoils and sleeves can be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a combustor assembly, said method comprises:

providing at least one sleeve having a plurality of inlets;

coupling at least one airfoil to at least one of the plurality of inlets defined in the at least one sleeve, wherein the at least one airfoil includes a pair of opposing sidewalls coupled together at a leading edge and at a trailing edge, a first end portion and a second end portion, each of the end portions extends substantially perpendicularly between the pair of opposing sidewalls, at least one first channel and at least one second channel that are each formed between the airfoil sidewalls and extend between the first end and second end portions for channeling cooling air therethrough, and at least one recessed section defined between the pair of opposing sidewalls for joining the at least one first channel to the at least one second channel, wherein at least a portion of the at least one recessed section extends a depth into a cooling passage that is shallower than a depth of each of the at least one first channel and the at least one second channel such that each of the at least one first channel and the at least one second channel channels the air in a direction that is substantially perpendicular to a direction of air flowing around said airfoil in said cooling passage; and coupling the at least one sleeve around the portion of the combustor assembly to be cooled.

2. A method in accordance with claim 1 wherein coupling at least one airfoil to at least one of the plurality of inlets further comprises coupling the at least one airfoil such that the leading edge and the trailing edge are substantially aligned with the direction of the air flowing in the portion of the combustor assembly to be cooled.

3. A method in accordance with claim 1 wherein coupling at least one airfoil to at least one of the plurality of inlets comprises coupling at least one airfoil to at least a plurality of inlets, wherein the at least one airfoil includes said at least one first channel and said at least one second channel for each inlet of the plurality of inlets.

4. A method in accordance with claim 1 wherein coupling at least one airfoil to at least one of the plurality of inlets comprises coupling a plurality of airfoils wherein at least a portion of the airfoils are aligned such that the leading edge and the trailing edge of each airfoil of the plurality of airfoils are substantially aligned with respect to each other.

5. A method in accordance with claim 4 wherein coupling a plurality of airfoils comprises coupling the airfoils so that the airfoils facilitate a turbulent flow of the air in the cooling passage.

6. A sleeve for use in a combustor assembly, said sleeve comprising a plurality of airfoil projections defined in said sleeve, each airfoil projection configured to channel cooling air into a cooling passage of said combustor assembly, each airfoil projection comprising:

a pair of opposing sidewalls coupled together at a leading edge and at a trailing edge;

a first end portion and a second end portion, each of said end portions extends substantially perpendicularly to and extends between said pair of opposing sidewalls;

at least one first channel and at least one second channel that are each defined between said pair of opposing sidewalls and extend from said first end portion to said second end portion for channeling cooling air therethrough; and at least one recessed section defined between said pair of opposing sidewalls and configured to join said at least one first channel and said at least one second channel, wherein at least a portion of said at least one recessed section extends a depth into said cooling passage that is shallower than a depth of each of said at least one first channel and said at least one second channel such that each of said at least one first channel and said at least one second channel channels the air in a direction that is substantially perpendicular to a direction of air flowing around said airfoil in said cooling passage.

7. A sleeve in accordance with claim 6 wherein said airfoil projection is substantially symmetrical about a center plane extending between said opposing sidewalls.

8. A sleeve in accordance with claim 6 wherein said leading edge of each airfoil projection is cusp-shaped.

9. A sleeve in accordance with claim 6 wherein each airfoil projection comprises a plurality of channels defined between said pair of opposing sidewalls.

10. A sleeve in accordance with claim 9 wherein each said channel of said plurality of channels for each airfoil projection has an airflow direction, wherein each said channel airflow direction is parallel with one another.

* * * * *